H. H. TAYLOR.
SPRING WHEEL.
APPLICATION FILED JUNE 22, 1907.

939,565.

Patented Nov. 9, 1909.
3 SHEETS—SHEET 3.

Witnesses:

Inventor:
Horace H. Taylor

UNITED STATES PATENT OFFICE.

HORACE H. TAYLOR, OF SAN JOSE, CALIFORNIA, ASSIGNOR OF ONE-HALF TO HIMSELF, AND ONE-HALF TO FRANK J. MAYHEW, OF SAN FRANCISCO, CALIFORNIA.

SPRING-WHEEL.

939,565.     Specification of Letters Patent.     Patented Nov. 9, 1909.

Application filed June 22, 1907. Serial No. 380,361.

*To all whom it may concern:*

Be it known that I, HORACE H. TAYLOR, a citizen of the United States, residing at San Jose, in the county of Santa Clara and State of California, have invented certain new and useful Improvements in Spring-Wheels, of which the following is a specification, reference being had to the accompanying drawings.

My invention relates to resilient vehicle wheels, and particularly to that class of resilient vehicle wheels containing an outer hub upon which the spokes and rim or felly are carried and an inner hub in which the axle spindle is mounted and spring connections between the inner and the outer hubs to allow the wheel to yield under strain, and its principal object is to provide a new and improved form of inner and outer hubs and a new and improved form of spring connections between them.

It has for a further object to provide a new and improved form of resilient wheel in which the hub composed of inner and outer hubs may be in compact form and easily assembled and taken down when need arises.

It has for a further object to improve resilient wheels in sundry particulars hereinafter set forth.

Figure 1:
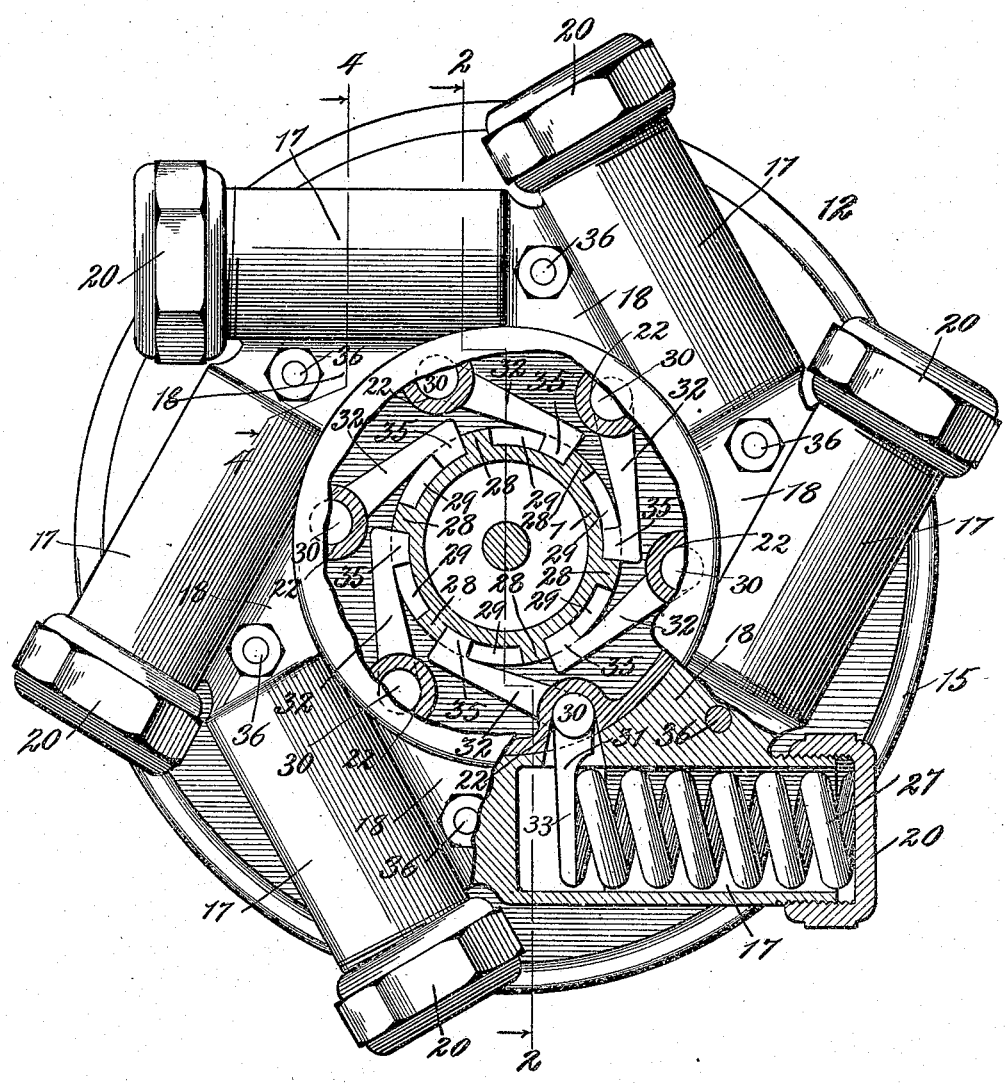
Figure 2:
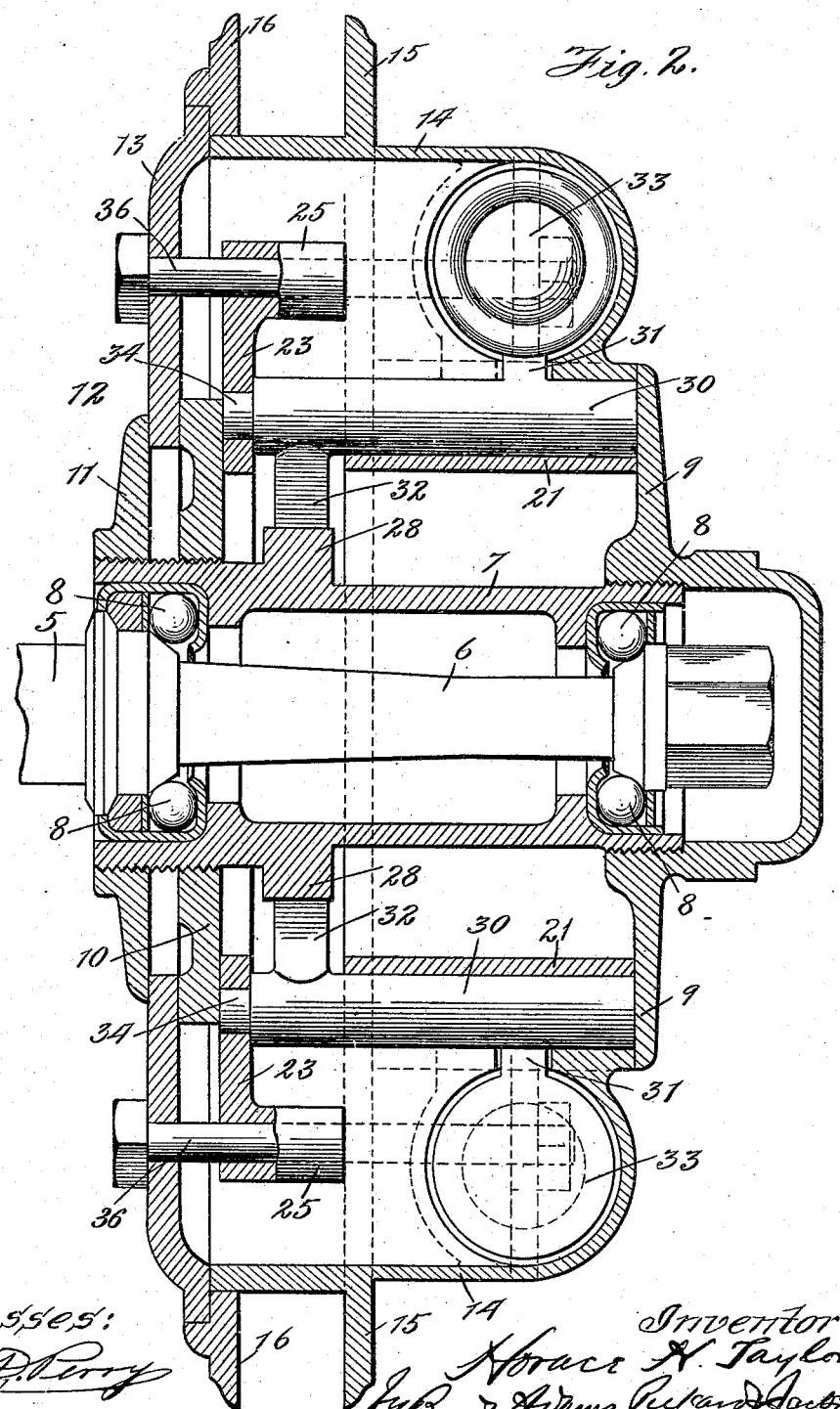
Figure 3:
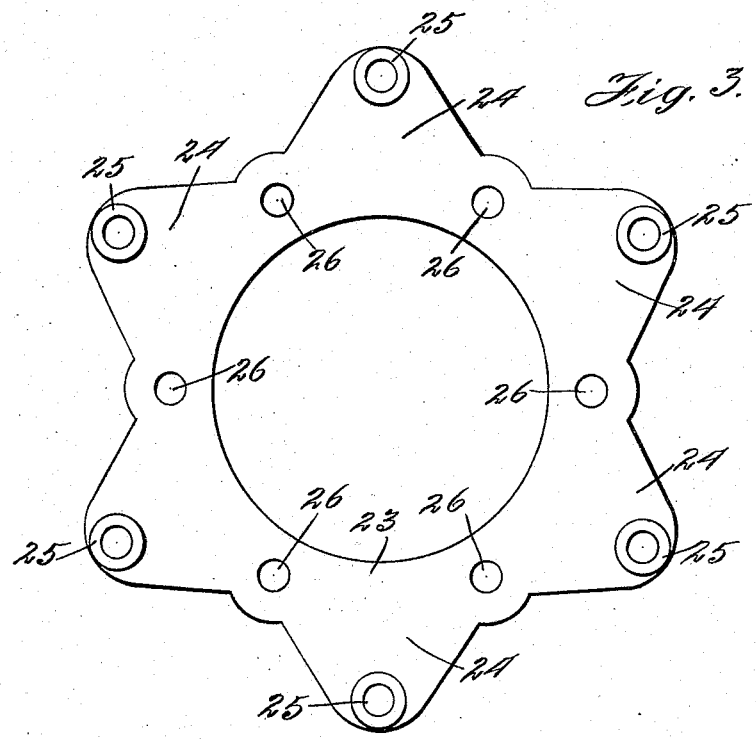
Figure 4:
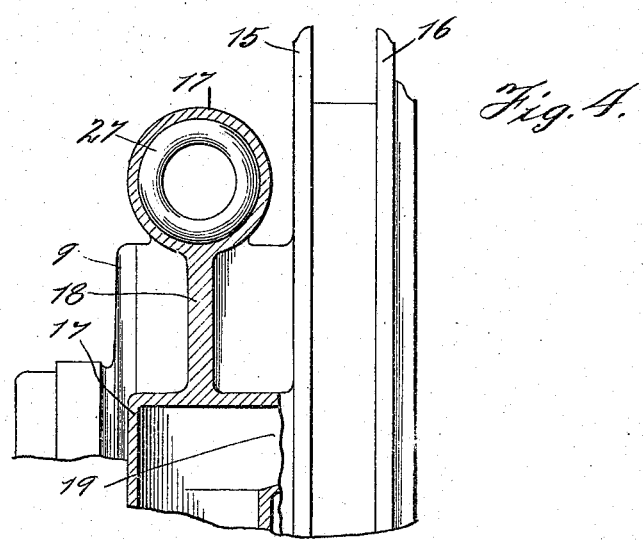

In the drawings,—Figure 1 is a side elevation of my invention with parts broken away to show the interior construction, the spokes and the rest of the wheel being omitted for clearness of illustration; Fig. 2 is a section on line 2—2 of Fig. 1, enlarged; Fig. 3 is a detail, being a side elevation of the spider in which sundry of the parts are supported, as hereinafter described; and Fig. 4 is a detail somewhat reduced, being a section on line 4—4 of Fig. 1.

5 indicates the axle carrying the spindle 6.

7 indicates the inner hub, in which the spindle 6 is carried mounted in ball bearings 8, which may be of any approved form.

9 indicates a cap, which is screwed upon the outer end of the inner hub 7.

10 indicates an annular plate, which is screwed upon the inner end of the hub 7 and whose opposing surfaces are flat to form a sliding bearing for the parts hereinafter described.

11 indicates an annular plate, which is screwed upon the inner end of the inner hub 7 in such a way as to leave a space between its inner surface and the outer surface of the annular plate 10. The inner surface of the plate 11 and the outer surface of the plate 10 facing one another are parallel to afford a sliding bearing for the parts hereinafter described.

12 indicates the outer hub, which is composed of an annular plate 13 and a casing 14. The inner and outer surfaces of the annular plate 13 are parallel and smooth whereby it may have a sliding fit between the opposite surfaces of the plates 10 and 11 so as to slide freely therein. The space between the plates 10 and 11 may be filled with oil or oil-saturated material for the purpose of oiling the parts. The casing 14 is provided on its exterior periphery with two circumferential flanges 15—16 between which the spokes (not shown) are adapted to be bolted, or otherwise secured in any well-known manner. The flange 15 is preferably integral with the casing 14 and the flange 16 removably secured thereto in any well-known way. The casing 14 with its attached parts, hereinafter described, is formed of steel, bronze, or other suitable material, and is preferably cast.

17 indicates a plurality of, preferably six, cylinders, which are cast with the casing 14 and are connected together by strengthening webs 18. The cylinders are closed at the bottom, as is best shown in Figs. 1 and 4, with an opening 19 extending across to permit the insertion of the parts hereinafter described. The cylinders 17 are open at their outer ends and are each fitted with a cap 20 which is screwed thereon, as is best shown in Fig. 1.

21 (see Fig. 2) indicates a wide ring provided with a plurality of circular-bottomed depressions 22, the same in number as the cylinders 17, and open from the periphery. The outer edge of this ring is adapted to bear against the inner surface of the cap 9 and it extends inwardly a suitable distance to afford a bearing for the cylindrical shaft of the rock-shafts hereinafter described and is supported by them when the wheel is assembled as hereinafter described.

23 indicates a spider having a circular opening at its center. The spider is provided with a number of projections 24 equal in number to the number of the cylinders 17, and each of the projections 24 is provided with a boss 25 by means of which the spider is supported by bolts 26 which pass through the plate 13 and the webs 18 and through the bosses 25 when the wheel is assembled. The outer surface of the spider 23 is adapted to bear upon the inner surface of the annular plate 10, resting against and sliding freely over the same, when the parts are assembled. The spider 23 is provided with a number of circular openings 26 equal in number to the number of cylinders 17, in which are journaled the ends of the shaft of the rock-shafts hereinafter described.

27 indicates spiral springs of suitable tension for the size and character of the wheel and adapted to slip within the cylinders 17.

28 indicates a circumferential member formed integral with the hub 7 and provided with a plurality of recesses 29 opening from its periphery and equal in number to the cylinders 17 and adapted to receive the ends of one of the arms of the rock-shafts hereinafter described.

30 indicates cylindrical rock-shafts provided with arms 31 and 32. The arms 31 carry—preferably formed integral therewith—circular plates or bearings 33 which are of sufficient size to just freely fit within the cylinders 17 and are adapted to enter the same through the openings 19. The end of each rock-shaft 30 toward the interior of the hub is provided with a trunnion 34 which is journaled in one of the openings 26 of the spider 23.

As is best shown in Fig. 2, the arms 31 and 32 of the rock-shaft are placed at such an angle with relation to each other that when the parts are in position the arms 32 will be substantially tangent to the shoulder 28 on the inner hub 7. The arms 32 are provided at their inner or free ends with the bent-over portions 35 which enter and engage the recesses 29. The plates 33 bear against the inner ends of the springs 27, as is best shown in Fig. 1.

The parts hereinabove described are assembled as follows:—The plate 10 is first screwed upon the hub 7. The annular plate 13 is then placed in position against it and the plate 11 screwed into position so that the inner portion of the plate 13 may slide between the opposing surfaces of the plates 10 and 11, bearing upon the same. The rock arms 30 are placed within the casing 14, the plates or bearings 33 being slipped into the openings 19 from the left in Fig. 2 and the ring 21 is placed in position so that the rock shafts 30 are journaled in the circular-bottomed depressions 22. The spider 23 is then placed in position with the trunnions 34 entering their recesses 26. The parts thus assembled are placed in the position shown in Fig. 2 upon the inner hub with the inner edge of the casing resting against the inner surface of the annular plate 13 near its periphery and the parts secured together by the bolts 36,—the turned-down ends 35 of the arms 32 of the rock-shafts 30 being placed in position to engage the recesses 29. The recesses 29 are elongated circumferentially so as to afford sufficient play for the ends of the rock arms 32 in the yielding operation of the wheel hereinafter described. The springs 27 are then placed in position and the caps 20 secured in place. The cap 9 is then screwed upon the outer end of the inner hub 7.

It will be observed from the above description that the inner and the outer hubs are prevented from lateral movement—that is to say, longitudinal of the axle—by the engagement of the plate 13 between the plates 10 and 11, which, however, allow play of the inner and outer hubs with relation to each other in a plane vertical to the axle of the wheel. When the wheel rests upon the ground, the weight of the vehicle upon the axle will be supported by the bearing of the arms 32 of the rock-shaft 30 upon the inner hub, and the bearing of the plates 33 upon the springs 27; and when any shocks come to the wheel the springs will yield in the direction of the shock, rocking the shafts 30 and providing due resiliency for the wheel. The turning of one hub upon the other to anything more than a very limited extent is prevented by the bearing of the turned-down portions 35 of the arm 32 with the recesses 29,—a limited play being necessary for the proper resiliency of the wheel and the play of the parts, and being provided by the play of the ends of the arms 32 in the bearings 29.

As has been said, for the purpose of clearness of illustration nothing of the wheel has been shown except the parts described as the spokes and fellies may be of any well-known form and carried by the outer hub in any well-known way, and form no part of my present invention. In order that the parts may be of sufficient size to clearly illustrate my invention, the other parts of the wheel have been omitted as they will be readily understood.

That which I claim as my invention, and desire to secure by Letters Patent, is,—

1. The combination with an inner hub, an outer hub, and means for preventing the lateral movement of one upon the other, of a plurality of cylinders mounted upon said outer hub, spiral springs inclosed in said cylinders, and rock-shafts having one of their arms enter said cylinders and engage said spiral springs and the other adapted to engage said inner hub.

2. The combination with an inner hub, an outer hub, and means for preventing the lateral movement of one upon the other, of cylinders mounted upon said outer hub, a spiral spring inclosed in each of said cylinders and rock shafts, each having one of its arms projecting within one of said cylinders and engaging the inner end of the spring therein, and having its outer arm extending substantially tangential to said inner hub and adapted to engage the same.

3. The combination with an inner hub, a circumferential member thereon having a plurality of recesses, an outer hub, and means for preventing the lateral movement of one of said hubs upon the other, of a plurality of cylinders carried on said outer hub and substantially at right angles with the radii of the inner hub which, projected, cross the inner ends of said cylinders, spiral springs in said cylinders, a plurality of rock-shafts having one of their arms adapted to engage the inner ends of said springs and the other of their arms extending substantially tangential to the said member on said inner hub and adapted to engage a recess thereon.

4. The combination with an inner hub provided with a peripheral recessed shoulder and with annular bearing plates, an outer hub consisting of an annular plate adapted to engage the bearing plates on said inner hub and a casing, of a plurality of cylinders on said casing, spiral springs carried by said cylinders, a spider removably secured within said casing, a ring carried in said casing and provided with a plurality of journals, and rock-shafts journaled in said ring and in said spider and provided with an arm adapted to engage the lower end of said springs and having the other arm extending substantially tangential to and adapted to engage said recessed peripheral shoulder on said inner hub.

HORACE H. TAYLOR.

Witnesses:
 ALBERT H. ADAMS,
 WILLIAM H. DE BUSK.